June 5, 1934.  G. S. BOHART  1,961,681
PROCESS FOR CANNING FOODS
Original Filed Aug. 27, 1930
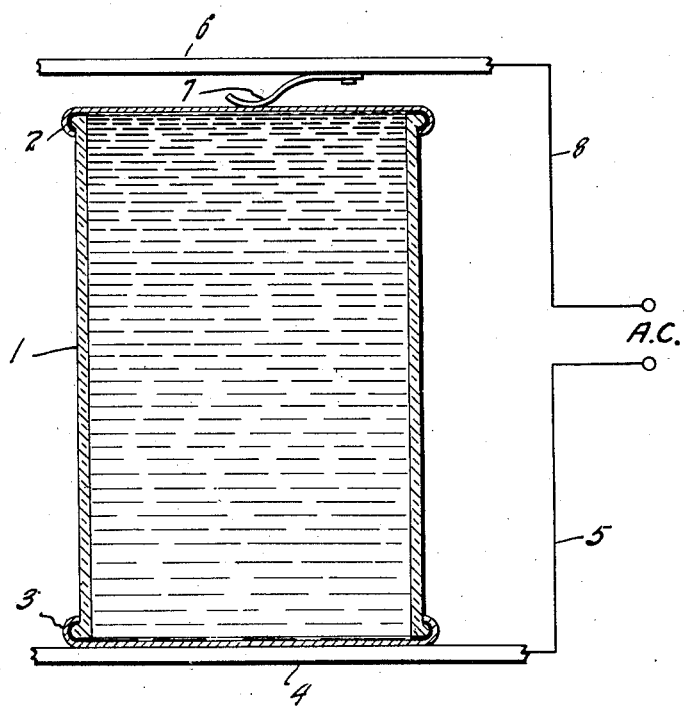
Inventor
G. S. BOHART
By Semmes & Semmes
Attorneys Patented June 5, 1934

1,961,681

UNITED STATES PATENT OFFICE 1,961,681

PROCESS FOR CANNING FOODS

George S. Bohart, Alameda County, Calif., assignor to National Canners Association, Washington, D. C., a corporation of Delaware Original application August 27, 1930, Serial No. 478,263. Divided and this application August 15, 1931, Serial No. 557,419

2 Claims. (Cl. 99—1)

This application is a division of my application, Serial No. 478,263, filed August 27, 1930.

This invention relates to improvements in processes for canning foods. In the usual method of canning foods, the food product to be treated is first preheated and then deposited in the open container. After sealing, the can is cooked either in boiling water or in a steam retort under pressure for a period of time sufficient to insure the destruction of the most resistant spoilage organisms.

The determination of a safe process for canning food depends upon the temperature at the center of the can and the time required at different temperatures to destroy spoilage bacteria. As noted, in the usual process, of which canned corn is an example, the mass is cooked in the steam retort at 250° F. for approximately seventy-five minutes. This extended period is required to insure the penetration of heat to the center of the mass. If this heat penetration factor could be eliminated, a cook of only ten minutes would suffice for the purpose of sterilization. Heretofore during processing, the portion of the food contents near the wall of the can has been cooked at the maximum temperature for practically the entire period, while the material at the center of the can reaches the maximum temperature, if at all, only at the very end of the period. As a result, much of the food product may be overcooked and, in the case of some materials such as corn, may lose its natural color and flavor.

It is an object of the present invention to provide a process of sterilizing food in which the maximum sterilization temperature at the center of the container may be reached sooner than by prior methods.

Another object is to provide a method of electrical sterilization of foods.

A further object is to provide a novel method of preheating foods which are subsequently canned.

With these and other equally important objects in view, the method comprehends the treatment of food to be canned in a special type of container whereby the material is subjected to electrical heating effects and thereby heated quickly and uniformly to the desired sterilization temperature.

In order to enable a ready comprehension of the invention, a typical physical embodiment is shown in the single figure of the accompanying drawing, showing a food container connected to an electric heating means for carrying out the method.

The purpose of the present invention is to obviate the protracted thermal treatment necessary in the prior processes and thereby insure a uniform, properly cooked product.

Broadly considered, the invention involves the concept of sterilizing canned food in hermetically sealed containers electrically.

I have found that if a food product, such as corn, is admitted to a container and the product treated to insure bacterial contamination, it may be sterilized in the container in a very short period of time, by subjecting it to the heating effects of an electrical current. A can having a non-conducting body and conducting ends as shown in the drawing may be used, although any type of can capable of carrying out the invention may be employed.

As shown in the drawing, such a structure may comprise the body 1, which may be constructed of suitable non-conducting material, such as glass, celluloid, or the like, and the conducting metallic ends 2 and 3 respectively.

I have found in my experimentation that when such a container was filled with uncooked cream style corn, preheated to 182° F. and it was then sealed and an alternating current of 60 cycles, 7 amperes, and 110 volts applied the temperature at the center of the can was raised to 250° F. in approximately one and three-quarters minutes. In order to insure sterilization, the temperature was maintained at this point for about ten minutes by reducing the current. The product was then allowed to cool and upon examination exhibited a color similar to that of corn cooked on the cob and superior to corn processed in the can in the usual manner.

The same improved results were found to obtain when preparing other food products. For example, a lot of spinach was prepared using the same type of container. This material was blanched for five minutes at 180° F. and hot brine was then added. The material in the can was then subjected to the action of an electric current of 60 cycles, 5 amperes and 110 volts. At the end of approximately five minutes and eighteen seconds, the temperature at the center of the can reached 250° F. To insure absolute sterilization, this temperature was maintained for six minutes by reducing the current.

From these experiments, it is obvious that this electrical method of processing presents decided advantages over the usual method involving the application of, so to speak, extraneous heat.

When food is sterilized by this electrical method, the material in the center of the container is heated just as rapidly as the material near the outside portions of the can and may be adequately sterilized by a cook of ten minutes or less. By reason of this short cooking period, the product largely retains its natural characteristics of color and flavor.

The examples given disclose the efficacy of the method because both corn and spinach are products in which the heat penetration is very slow.

In actually carrying out the process commercially, the material to be treated may be preheated and admitted to suitable containers such as hereinbefore described. The top 2 may be sealed on and the material after being added to the container may be subjected to the electric heating. This may be done by placing the bottoms of the cans upon a metallic plate 4, which is connected at one end to a conductor leading to a source of alternating current. The plate 4 may be of considerable length so as to be sufficient to accommodate a large number of cans at one treatment. The other terminal of the electric heating unit may comprise a metallic bar 6, spaced above the top of the can to which are connected a plurality of metallic contacts 7. For the purpose of simplicity, these contacts are shown as a leaf spring which makes good electrical and mechanical connection with the top of the can. The metallic member 6, similarly to the corresponding member 4, is connected through a conductor 8 to the source of alternating current. When the current is turned on, the top and bottom of the can become in effect two electrodes connected to a current source and the material within the can is subjected to uniform resistance heating. Continuous methods may also be employed by providing suitable means for holding the ends of the container in position during the application of the heating current at the same time the cans travel along a conveying device. This may be accomplished by chucks which exactly engage and press against the ends of the can with sufficient force to withstand the internal pressure developed during heating of the contents, or by passing the cans through suitable valves on to a conveyor in a chamber containing air under sufficient pressure to more than balance the internal pressure developed by the heating, where they may be first heated as described above, then cooled in water and passed out the opposite end of the chamber through a second valve. In addition to this, the alternating current may exert a bactericidal action. As is known, all bacteria carry an electrical charge. When an electric current flows through a food product in one direction the bacteria are impelled toward one electrode; when the current is reversed they are impelled in the opposite direction. It is therefore possible, aside from the heating effect, that the frequency of the current may have a decided effect upon the time and temperature necessary for sterilization.

This general method of treatment in addition to sterilizing food products may also be employed for the exhausting of canned foods. This has been done experimentally by providing a glass cylinder having a metallic base to which was connected one terminal of an alternating current source. A metallic disc connected to the other conductor from the alternating current source was suspended above the top of the condenser in such a manner as to contact with the food product therein. The temperature of tomatoes, for instance, was raised from 67° F. to 200° F. in four and a half minutes by employing an alternating current of 60 cycles, 3 amperes, and 110 volts. Using a steam exhaust a similar change in the temperature of the contents at the center would have required at least two hours. A similar result may be obtained by connecting a tin container to an electric circuit to serve as one electrode and immersing a second electrode in the product.

It will now be observed that the proposed method presents many advantages. Not only does it decrease the time necessary for processing but it insures a properly cooked material without the dangers and undesirable results of localized overheating. The container itself may be made up of readily available materials and may be treated in large numbers; the process, therefore, is readily susceptible to economic commercial production methods.

While I have shown and described alternating current as being used to carry out my invention, it is to be understood that direct current may also be used to advantage. It is to be clearly understood that my process is not to be limited to the specific one described as many variations may be made therein without departing from the spirit of the invention or exceeding the scope of the appended claims.

I claim:

1. The process of sterilizing non-liquid foods comprising preheating the food to substantially 180° F., hermetically sealing the food in a container and then passing an electric current through the food to heat the same until substantially 250° F. is reached in the center and reducing the current to maintain such temperature for approximately ten minutes.

2. A process of sterilizing canned corn comprising preheating the corn to substantially 180° F., hermetically sealing the corn in a container, and then passing an electric current through the food to heat the same for a period of substantially one and three-fourths minutes and until the temperature at the center of the can reaches 250° F., and reducing the current but maintaining such temperature for approximately ten minutes.

GEORGE S. BOHART.